(12) United States Patent
Matsuo

(10) Patent No.: US 7,072,310 B2
(45) Date of Patent: Jul. 4, 2006

(54) ECHO CANCELING SYSTEM

(75) Inventor: Naoshi Matsuo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 867 days.

(21) Appl. No.: 09/867,664

(22) Filed: May 31, 2001

(65) Prior Publication Data

US 2002/0075818 A1   Jun. 20, 2002

(30) Foreign Application Priority Data

Nov. 1, 2000   (JP)   ............................. 2000-334455
Apr. 5, 2001   (JP)   ............................. 2001-107575

(51) Int. Cl.
   *H04B 3/20*   (2006.01)
(52) U.S. Cl. .................. 370/286; 379/406.06
(58) Field of Classification Search ................ 370/286, 370/289, 290, 291; 379/406.06, 406.07, 379/406.08
See application file for complete search history.

(56) References Cited

U.S. PATENT DOCUMENTS

| | | | |
|---|---|---|---|
| 4,764,955 | A | 8/1988 | Galand et al. |
| 4,935,919 | A | 6/1990 | Hiraguchi |
| 5,313,498 | A | 5/1994 | Sano |
| 5,400,399 | A | 3/1995 | Umemoto et al. |
| 5,410,595 | A | 4/1995 | Park et al. |

FOREIGN PATENT DOCUMENTS

| | | |
|---|---|---|
| JP | 62-107533 | 5/1987 |
| JP | 63-87027 | 4/1988 |
| JP | 1-319353 | 12/1989 |
| JP | 5-292174 | 11/1993 |
| JP | 5-313673 | 11/1993 |
| JP | 6-260972 | 9/1994 |
| JP | 7-240722 | 9/1995 |
| JP | 8-56218 | 2/1996 |
| JP | 9-116468 | 5/1997 |
| JP | 9-307609 | 11/1997 |
| JP | 11-8696 | 1/1999 |
| JP | 11-164389 | 6/1999 |
| JP | 11-187086 | 7/1999 |
| JP | 2000-3550 | 1/2000 |
| JP | 2000-115351 | 4/2000 |

(Continued)

OTHER PUBLICATIONS

JPO Office Action dated Mar. 22, 2005.

*Primary Examiner*—Huy D. Vu
*Assistant Examiner*—Christine Ng
(74) *Attorney, Agent, or Firm*—Staas & Halsey LLP

(57) ABSTRACT

An optimal echo canceling processing is provided regardless of a condition of a partner's system and even in the condition with large delay amount and large fluctuation amplitude of a network transmission. A speaker 10 inputs a voice via a microphone 11. A voice signal of this voice is transmitted to a terminal 14 of a conversation partner via a VoIP application 13 and the internet 30. Concurrently, the voice signal is inputted to an echo canceller 100. The echo canceller 100 detects sound characteristics of an echo path in advance or dynamically, adjusts a filter coefficient for generating an echo canceling signal, and receives an adjustment by a user. The echo canceller 100 generates the echo canceling signal by processing the received voice signal based on the sound characteristics and the adjusting amount. The echo canceling signal is subtracted from a response signal containing an echo that has been re-inputted from a loudspeaker 22 of the partner via a microphone 21.

11 Claims, 14 Drawing Sheets

ECHO CANCELING SYSTEM

BACKGROUND OF THE INVENTION

1. Field of the Invention

The present invention relates to an echo canceling system in a full-duplex communication system.

2. Description of Related Art

Accompanying a widespread use of the internet, various types of services utilizing the internet have started. For example, what is called a computer telephony system using a technology such as VoIP via the internet has become common. The following is a description of a conventional full-duplex communication system using the VoIP application via the internet.

FIG. 13 is a diagram schematically showing the full-duplex communication system. In FIG. 13, numerals 10 and 20 both denote speakers. Hereinafter, "speaker" means a person who holds a conversation by using the computer telephony, and "loudspeaker" means a device of the computer telephony outputting the transmitted voice. For convenience, the following description is directed to an example of the case where the speaker 10 speaks and the voice of this person is transmitted to the speaker 20 side. Numerals 11 and 21 denote microphones, numerals 12 and 22 denote loudspeakers, numerals 13 and 23 denote VoIP applications, numerals 14 and 24 denote terminals, and numeral 30 denotes the internet. A communication interface and other devices are omitted in this figure for convenience.

When the speaker 10 inputs voice to the microphone 11, the VoIP application 13 receives a voice signal corresponding to this voice and performs necessary processings such as a sampling, so as to be transmitted from the terminal 14 to the internet 30 as packet data. All packet data follow respective routes on the internet and reach the terminal 24. These packet data are assembled sequentially and subjected to necessary processings by the VoIP application 23, then outputted from the loudspeaker 22 as voice.

During such processings, it has been known conventionally that a phenomenon called an echo occurs. The voice outputted from the loudspeaker 22 not only reaches the conversation partner 20, but sometimes is re-inputted undesirably to the microphone 21 as voice. In this case, the voice re-inputted from the microphone 21 is transmitted via the VoIP application 23 in the terminal 24, the internet 30 and the VoIP application 13 in the terminal 14, thus being outputted from the loudspeaker 12 as voice. This forms a kind of loop. In a path that forms this loop generating the echo (hereinafter, referred to as "an echo path"), transmission delay is generated. In other words, the speaker 10 hears the voice that he/she inputted to the microphone 11 from the loudspeaker 12 a little later. When this echo occurs, it is known that the speaker finds it very difficult to talk and listen to the voice of the partner. Also, when the echo level is very high so that the echo diverges without fading, a phenomenon called howling occurs. In this case, it is very difficult to have a conversation.

In response to this, an echo canceller has been used conventionally. FIG. 14 is a diagram schematically showing an echo canceling system using the conventional echo canceller. In FIG. 14, a terminal 24 on a conversation partner 20 side has an echo canceller 25. The echo canceller 25 receives a signal to be outputted via a loudspeaker 22 as an input and subtracts the received signal from a signal captured by a microphone 21, thereby canceling a voice signal that has been undesirably headed and re-inputted in the microphone 21.

As illustrated in FIG. 14, the conventional echo canceller has had a configuration that the voice signal undesirably head from the loudspeaker toward the adjacent microphone is canceled on the spot, thus preventing this undesirably received voice signal from returning to a system on the speaker side.

However, the echo canceling system using the conventional echo canceller has the following problems.

First, an echo canceller is not always installed and operated in a system on the conversation partner side. In the conventional echo canceling, it is necessary to cancel out the undesirable path of the voice between the loudspeaker and the microphone in the system on the partner side (hereinafter, referred to as "a far-end undesirable path"). For this purpose, the echo canceller has to be installed and operated in the system on the partner side. However, this is not always expected. If it is not installed and operated, the speaker has to ask the partner to install and operate the echo canceller.

Second, when performing an echo canceling processing, it is necessary to consider not only canceling out the echo caused by the far-end undesirable path but also canceling out an echo caused by the undesirable path of the voice between the loudspeaker and the microphone in the system on the speaker side (hereinafter, referred to as "a near-end undesirable path"). The voice of the conversation partner and the voice in the case where the far-end undesirable path is not completely canceled out are outputted from the loudspeaker on the speaker side. The near-end undesirable path caused by the input of those voices from the loudspeaker to the microphone also has to be prevented.

Third, the speaker, who will actually hear the echo, cannot make fine adjustments to the echo canceling processing for him/herself. In a conversation, the echo causes a problem that the speaker finds it difficult to talk and listen because of his/her own echo voice outputted from the loudspeaker. Accordingly, how the speaker feels the echo is subjective. Therefore, it is preferable that, in the echo canceling processing, the speaker can adjust a hearing condition of the echo for him/herself. However, in the conventional echo canceling system, since the echo canceller is located in the system on the partner side, the speaker cannot adjust the echo canceller according to the hearing condition of the echo. Although it is possible technologically to operate parameters of the echo canceller in the system on the partner side by remote control, the partner side cannot accept such environment from the viewpoint of security.

Such a problem also means that a user who has introduced the echo canceller in his/her own system cannot perceive the effect of it directly. In other words, the user who has introduced the echo canceller can neither feel benefit of an echo canceling effect by the introduction, nor adjust the echo canceller in order to achieve better echo canceling effect. The echo canceller is introduced not for him/herself but for partner side. Thus, even when a user introduces it, its cost and the benefit for the user are not balanced. This is one of the obstacles of the diffusion of the echo canceller.

Fourth, when voice signals are exchanged by packet telecommunication via the internet, the condition of the echo that is heard actually by the speaker varies easily. The echo is influenced by a transmission condition of a network. In a transmission of the voice signals by packet telecommunication via the internet, the delay amount of a network transmission is large. Also, the condition of the network transmission varies easily because of the routing and the variation of traffic amount, leading to a large characteristic fluctuation when transmitting the voice signals. Therefore, the characteristic amount cannot be determined simply from the distance between the speakers and will fluctuate even if it is calculated once. Consequently, the mere installation of the conventional echo canceller on the speaker side does not make it possible to obtain an appropriate signal for canceling the echo in a reliable manner.

SUMMARY OF THE INVENTION

In view of the problems described above, it is an object of the present invention to provide an echo canceling system in which a speaker can always use an echo canceling processing regardless of a condition of a conversation partner's system, that is, whether or not an echo canceller is installed and operated in the conversation partner's system.

Also, it is an object of the present invention to provide an echo canceling system in which the speaker, who will hear an echo, can make fine adjustments to the echo canceling processing for him/herself. This also leads to the effect of the echo canceller enjoyed directly by a user who has introduced the echo canceller.

It is a further object of the present invention to provide an echo canceling system that can execute an optimal echo canceling processing even in the condition with large delay amount and large fluctuation amplitude of a network transmission, such as in exchanging voice signals by packet telecommunication via the internet.

In order to achieve the above-mentioned objects, an echo canceling system for a full-duplex communication system of the present invention includes a sound characteristics detecting portion for detecting sound characteristics information of an echo path seen from a speaker side, and an echo canceling processing portion for canceling an echo by generating an echo canceling signal from a voice signal based on the sound characteristics information detected by the sound characteristics detecting portion and by superimposing the echo canceling signal on the voice signal returned from a system on a conversation partner side. Those portions are installed in a communication system not on the conversation partner side but on the speaker side.

With the above configuration, the echo canceling processing can be carried out in the system on the speaker side based on the sound characteristics information of the echo path seen from the speaker side, so the echo canceling processing can be used regardless of a configuration of the system on the conversation partner side. In addition, it is possible to execute an optimal echo canceling processing taking a transmission delay into account even in the condition with a large delay amount and a large fluctuation amplitude of a network transmission, such as in sending voice signals by packet telecommunication via the internet.

It is preferable that the echo canceling system of the present invention further includes an adjusting portion for receiving a tuning signal of an echo canceling processing by a speaker. The echo canceling processing portion generates the echo canceling signal from the voice signal using the tuning signal in addition to the sound characteristics information detected by the sound characteristics detecting portion.

With the above configuration, it is possible to carry out the echo canceling processing in the system on the speaker side based on the adjusting amount of the echo canceling processing inputted by the speaker in addition to the sound characteristics information of the echo path seen from the speaker side.

Next, in the above configuration, when the sound characteristics detecting portion detects the sound characteristics of the echo path, it is preferable that the sound characteristics detecting portion includes a signal generating portion for generating a sound characteristics detecting signal, which serves as a reference signal, and before starting a conversation, the sound characteristics detecting portion detects the sound characteristics information of the echo path seen from the speaker side using the sound characteristics detecting signal and a response signal returned from the conversation partner side. For example, when using white noise, an impulse signal or the like is used as the reference signal, it is possible to detect the sound characteristics information of the echo path in an accurate manner. A voice signal inputted during the conversation also may be used as the reference signal.

Also, it is preferable that, in detecting the sound characteristics information of the echo path by the sound characteristics detecting portion, a threshold and a correlation search range with respect to a correlation value between the reference signal in the system on the speaker side and the response signal returned from the conversation partner side can be adjusted.

This is because, in the condition with large delay amount and large fluctuation amplitude of a network transmission, it is necessary to dynamically adjust the range in which the delay amount is searched, and to flexibly adjust the search range in order to suitably detect the delay amount that varies even after it is calculated once.

Next, it is preferable that the echo canceling signal used in the echo canceling processing of the echo canceling processing portion is divided into a delayed part and a signal part following the delayed part, and the echo canceling processing portion includes a delay filter for providing a delay corresponding to the delayed part and a signal filter for generating a signal corresponding to the signal part.

With the above configuration, the delayed part of the echo path in the signal used in the echo canceling processing can be processed by the delay filter, thereby reducing an arithmetic processing amount.

Next, it is preferable that the system on the speaker side includes a loudspeaker and a plurality of microphones and performs a synchronous addition of input voice signals of the plurality of the microphones with respect to a direction of the speaker so as to enhance a voice signal. Also, it is preferable that the system on the speaker side includes a loudspeaker and a plurality of microphones and performs a synchronous subtraction of input voice signals of the plurality of the microphones with respect to a direction of the loudspeaker so as to cancel out an echo signal outputted from the loudspeaker.

By combining the input voice signal processings of the plurality of the microphones as in the above configuration, it is possible to perform processing of enhancing the voice signal of the speaker and that of canceling the near-end echo signal.

The speaker can have the initiative in making adjustments. For example, the speaker can choose execution or suspension of the echo canceling processing by the echo canceling processing portion and of the sound characteristics information detecting processing of the echo path by the sound characteristics detecting portion, and the sound characteristics detecting portion starts processing of detecting the sound characteristics information by the instruction from the speaker. In this case, by adopting the system on the speaker side including a loudspeaker and a plurality of microphones, in which the level of the output of the loudspeaker is measured by detecting a sound source using the input voice signals of the plurality of the microphones and the execution of the sound characteristics detecting processing of the echo path by the sound characteristics detecting portion is chosen when the output of the loudspeaker is greater than a predetermined value, a filter coefficient of the echo canceling processing portion can be updated so as not to cancel a voice signal of the speaker but to cancel only the near-end echo signal.

DESCRIPTION OF THE PREFERRED EMBODIMENTS

The following is a description of an echo canceling system of the present invention, with reference to the accompanying drawings.

First Embodiment

In an echo canceling system of the first embodiment of the present invention, an echo canceller is installed in a system on a speaker side, so that a canceling processing of an echo generated in a communications equipment on a conversation partner side is carried out in the system on the speaker side, eliminating the need for this processing on the conversation partner side. The echo canceling system of the first embodiment of the present invention includes a sound characteristics detecting portion for detecting sound characteristics information of an echo path seen from the speaker side, and an echo canceling processing portion for canceling an echo by generating an echo canceling signal from a voice signal on the basis of the detected sound characteristics information and an inputted tuning signal and superimposing the echo canceling signal on a voice signal returned from the system on the partner side. In addition, the first embodiment has a configuration also provided with an adjusting portion for receiving an adjustment of the echo canceling processing by the speaker.

Figure 1:
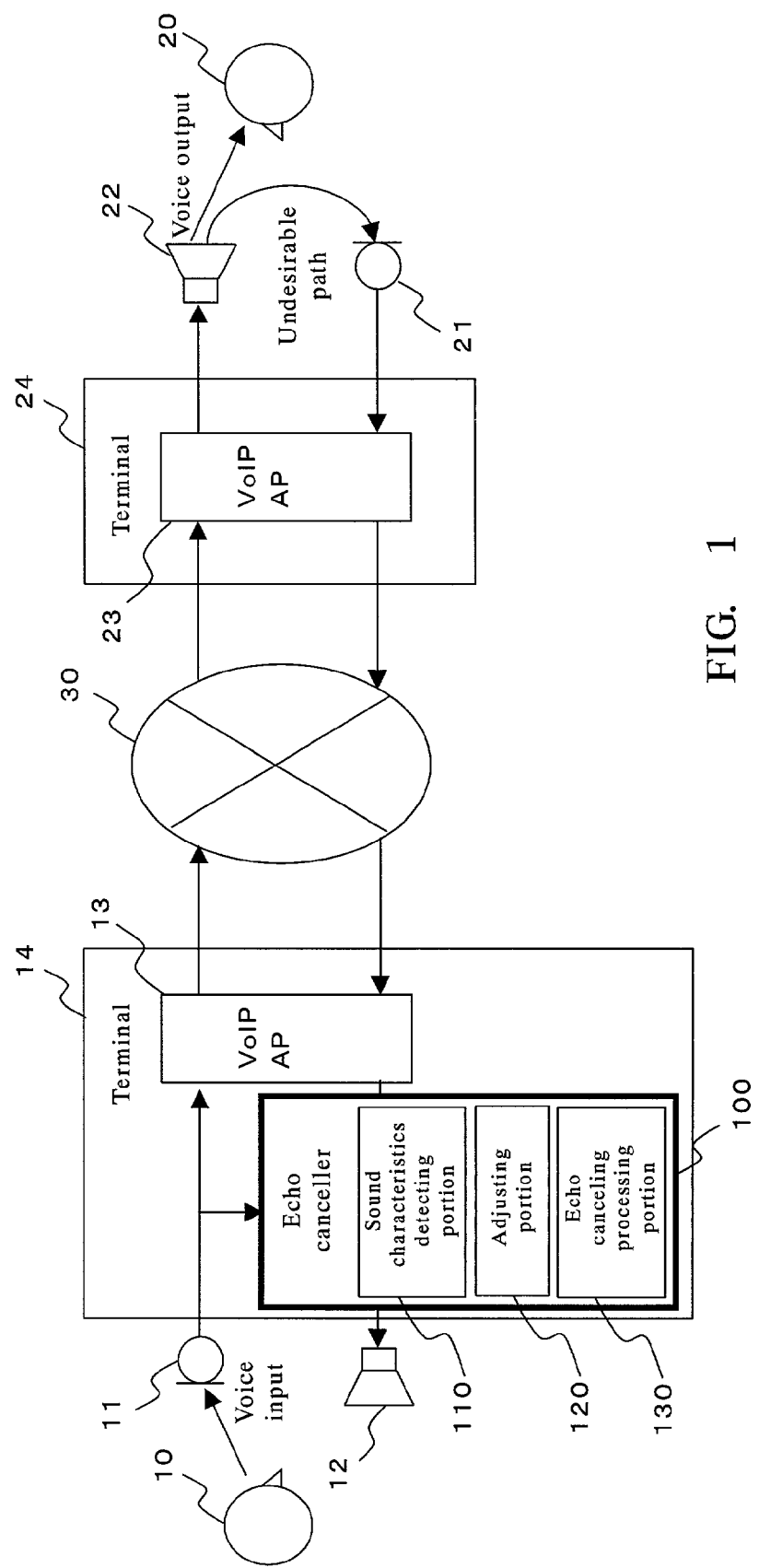
FIG. 1 is a diagram schematically showing an echo canceling system of a first embodiment of the present invention.

FIG. 1 is a diagram schematically showing the echo canceling system of the first embodiment of the present invention. In FIG. 1, numerals 10 and 20 both denote speakers. For convenience, the following description is directed to an example of the case where the speaker 10 speaks and the voice of this person is transmitted to the speaker 20 side. Numerals 11 and 21 denote microphones, numerals 12 and 22 denote loudspeakers, numerals 13 and 23 denote VoIP applications, numerals 14 and 24 denote terminals, and numeral 30 denotes the internet.

Numeral 100 denotes an echo canceller, which includes a sound characteristics detecting portion 110, an adjusting portion 120 and an echo canceling processing portion 130. As shown in FIG. 1, the echo canceller 100 is incorporated in the terminal 14 on the speaker side. Signals inputted to the echo canceller 100 are a voice signal and a response signal returned via an echo path, while a signal outputted from the echo canceller 100 is an outputted voice signal to the loudspeaker 12. A communication interface and other devices are omitted in this figure for convenience.

The sound characteristics detecting portion 110 detects the sound characteristics information of the echo path seen from the speaker side. The sound characteristics information of the echo path is detected from the voice signal and the response signal returned via the echo path. For example, as described below, adjustments are made such that a difference between a processed signal obtained by arithmetically processing the voice signal and the response signal becomes zero, thereby obtaining the sound characteristics information of the echo path.

The adjusting portion 120 receives the adjustment of the echo canceling processing by the speaker and generates the tuning signal.

The echo canceling processing portion 130 generates an echo canceling signal from the voice signal based on the sound characteristics information detected by the sound characteristics detecting portion 110 and superimposes the echo canceling signal on the voice signal returned from the system on the conversation partner side, thereby canceling the echo. The first embodiment has a configuration in which the echo canceling processing portion 130 generates the echo canceling signal using the tuning signal inputted via the adjusting portion 120 in addition to the sound characteristics information detected by the sound characteristics detecting portion 110.

Figure 2:
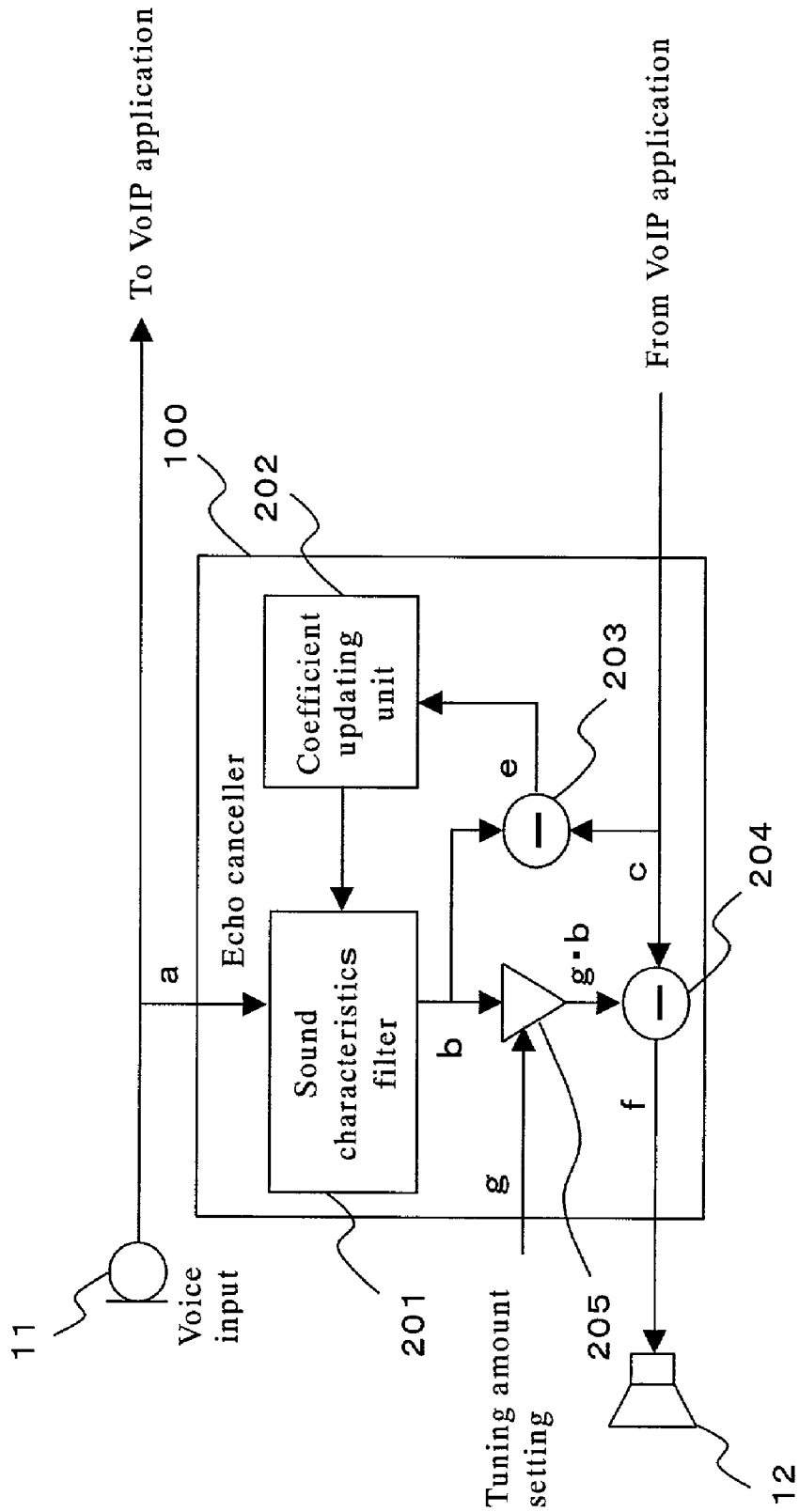
FIG. 2 is a diagram of one example of a specific module configuration, mainly showing an echo canceller 100 according to the present invention.

FIG. 2 is a diagram of an example of a specific module configuration, mainly showing the echo canceller 100 according to the present invention. Numeral 201 denotes a sound characteristics filter including a FIR filter (finite impulse response filter) etc., numeral 202 denotes a coefficient updating unit, and numerals 203 and 204 denote subtracters. Numeral 205 denotes a gain controller.

The relationship between each portion in the echo canceller 100 shown in FIG. 1 and the specific module shown in FIG. 2 will be described in the following.

The sound characteristics detecting portion 110 in FIG. 1 corresponds to the sound characteristics filter 201, the coefficient updating unit 202 and the subtracter 203 in FIG. 2. In the present embodiment, the voice signal is used as a reference signal. The sound characteristics detecting portion 110 detects the sound characteristics information of the echo path seen from the speaker side from the voice signal ("a" in FIG. 2) serving as the reference signal and the response signal ("c" in FIG. 2) returned via the echo path. For example, as described below, a differential signal ("e" in FIG. 2) between the signal ("b" in FIG. 2) obtained by arithmetically processing the voice signal by the sound characteristics filter 201 and the response signal ("c" in FIG. 2) is calculated by the subtracter 203. Then, adjustments are made by the coefficient updating unit 202 such that this differential signal becomes zero. As a result, the coefficient of the sound characteristics filter 201 becomes a coefficient for calculation corresponding to the sound characteristics information of the echo path.

The adjusting portion 120 in FIG. 1 corresponds to the gain controller 205 in FIG. 2, which has an external input system that allows an adjustment by the speaker, so that the speaker can adjust an adjusting amount of the gain controller 205 by him/herself. The gain coefficient "g" can be adjusted in the range, for example, from 0.0 to 1.0. When the gain coefficient "g" is 0.0, the echo canceling processing is not performed. In other words, the speaker can choose execution or suspension of the echo canceling processing by the echo canceling processing portion.

The echo canceling processing portion 130 in FIG. 1 corresponds to the sound characteristics filter 201, the gain controller 205 and the subtracter 204 in FIG. 2. In generating the echo canceling signal, the sound characteristics filter 201, in which the coefficient is adjusted as the sound characteristics detecting portion 110, processes the received voice signal ("a" in FIG. 2) arithmetically by reflecting the sound characteristics ("b" in FIG. 2). Then, an adjustment is made by the speaker with the gain controller 205 so as to generate the echo canceling signal ("g·b" in FIG. 2). Subsequently, in the subtracter 204, the echo canceling signal ("g·b" in FIG. 2) is superimposed on the voice signal ("c" in FIG. 2) that is returned from the system on the partner side, in other words, the echo canceling signal is subtracted, thereby generating a signal ("f" in FIG. 2) in which an echo is canceled, so as to be outputted to the loudspeaker 12.

Now, how the sound characteristics filter 201 updates the coefficient for simulating the sound characteristics of the echo path will be described in detail. One example is a method of updating the coefficient based on a learning identification method by using a FIR filter (finite impulse response filter) as the sound characteristics filter 201, which will be described in the following.

An arithmetic processing by the FIR filter can be expressed by Equation 1.

$$b_i = \sum_{j=0}^{n-1} h_j a_{i-j}$$

Equation 1

"$a_i$" represents a signal from the microphone 11, namely, an input signal to the filter. "$b_i$" represents an output signal of the filter. The subscript "i" represents a sampling number. "$h_j$" represents a filter coefficient, and "n" represents an order.

Next, the update of the filter coefficient $h_j$ is expressed by Equation 2.

$$h_j = h_j + \alpha e_i \frac{a_{i-j}}{\|a\|^2} \text{ where}$$

$$e_i = c_i - b_i$$

$$\|a\|^2 = \sum_{j=0}^{n-1} a_{i-j}^2$$

Equation 2

"$\alpha$" generally is a constant, and $0.0<\alpha<1.0$. "$c_i$" represents a response signal from the system on the conversation partner side.

A signal "$f_i$" to be transmitted to the loudspeaker 12 is expressed by Equation 3.

$$f_i = c_i - g \cdot b_i$$

Equation 3

By using the echo canceling system of the present invention with the above configuration, it becomes possible to cancel the echo that is heard by the speaker by the echo canceller installed in the system on the speaker side. The speaker can make fine adjustments to the echo canceling processing for him/herself and enjoy the effect of the echo canceller directly. The optimal echo canceling processing can be executed even in the condition with large fluctuation amplitude of the sound characteristics in exchanging the voice signals via the internet.

In addition, the canceling processing of the echo generated in the communications equipment on the conversation partner side can be carried out in the system on the speaker side, eliminating the need for the echo canceling processing on the conversation partner side as conventionally did. Therefore, it is possible to execute the echo canceling processing in a reliable manner regardless of the condition of a voice processing system of the partner.

Second Embodiment

The second embodiment is directed to an echo canceling system in which a contrivance in the sound characteristics detecting processing is incorporated. In this system, a section containing a significant voice signal serving as a reference signal is detected from a signal received from the microphone 11 and a section of a response signal containing an echo with respect to a voice is detected from a response signal that is obtained from the partner side and serves as a comparative signal in an accurate and flexible manner. The first embodiment was described on the assumption that the section containing the voice signal $a_i$, serving as the reference signal and the section of the response signal $c_i$ containing the echo serving as the comparative signal are fixed. However, the sound characteristics such as a network delay amount are not fixed in an actual conversation. Therefore, it is necessary to discriminate where the section containing these signals is. In the second embodiment, the section of the response signal containing the echo will be discriminated.

Figure 3:
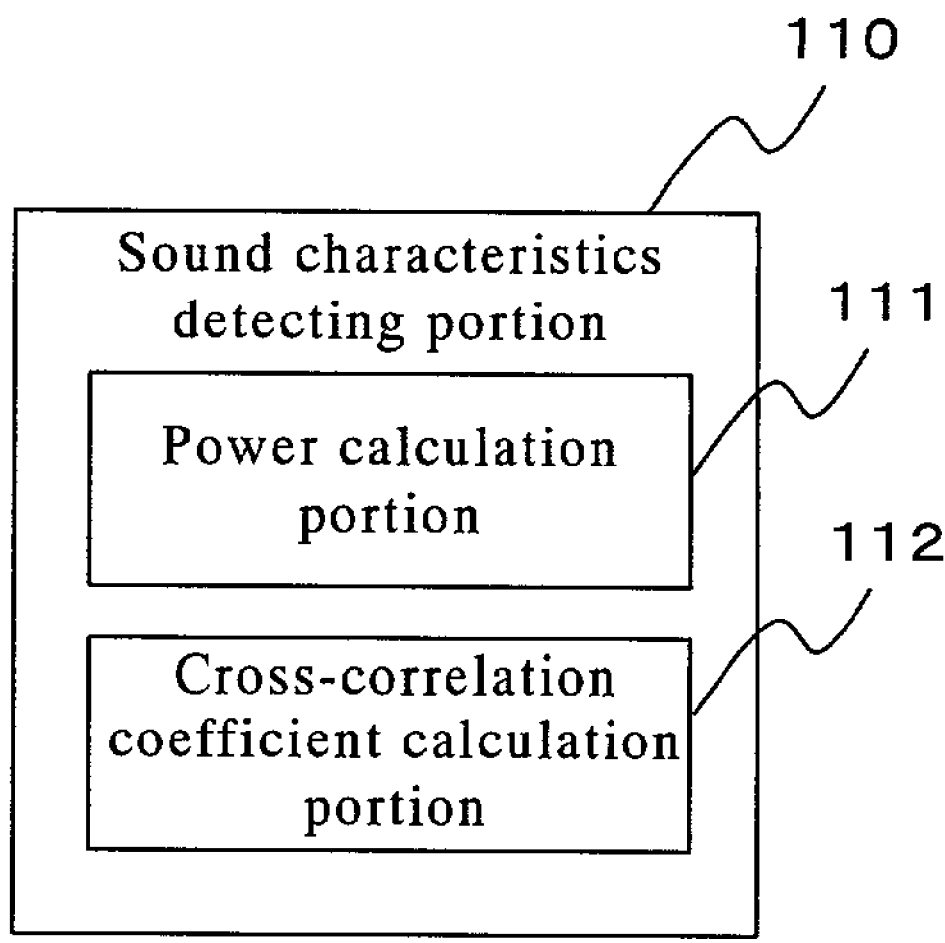
FIG. 3 shows a structural example of a sound characteristics detecting portion 110 for performing a processing of discriminating a section containing a voice signal $a_i$ serving as a reference signal and that of a response signal $c_i$ containing an echo serving as a comparative signal.

FIG. 3 shows a structural example of the sound characteristics detecting portion 110 for performing a processing of discriminating the section containing the voice signal $a_i$ serving as the reference signal and the section of the response signal $c_i$ containing the echo serving as the comparative signal. In FIG. 3, the sound characteristics detecting portion 110 includes a power calculation portion 111 and a cross-correlation coefficient calculation portion 112.

The power calculation portion 111 is used for examining a power in the voice signal and detecting a part containing a significant voice signal in this voice signal. The power in the received voice signal is calculated, so that the part having the power greater than a predetermined threshold is regarded as the significant voice signal to be the reference signal, moving on to the subsequent calculation processing of the cross-correlation coefficient with respect to the response signal. A wait processing is performed until the signal having the power satisfying the predetermined threshold is obtained.

The power calculation by the power calculation portion 111 is expressed by Equation 4.

$$pow_i = \sum_{j=0}^{n'-1} a_{i-j}^2 \qquad \text{Equation 4}$$

"n" represents an order for the power calculation.

First, the section in the signal to be the reference signal $a_i$ is determined by Equation 4.

The cross-correlation coefficient calculation portion 112 calculates the cross-correlation coefficient of the voice signal as the reference signal and the response signal as the comparative signal. This cross-correlation coefficient is calculated as Equation 5. A search range of the response signal is divided into signal sections "$c_{(i+k-j)}$", so as to search a section in which the cross-correlation coefficient with the voice signal as the reference signal is largest. The subscript "k" represents an order of the cross-correlation coefficient, which is, namely, a section number in the range in which the cross-correlation is searched. Accordingly, the expansion of the range of "k" widens the range in which the cross-correlation is searched.

$$r(k) = \sum_{j=0}^{n''-1} a_{i-j} c_{i+k-j} \qquad \text{Equation 5}$$

where $k_{Min} \leq k \leq k_{MAX}$. "$k_{MIN}$" and "$k_{MAX}$" indicate a preset search range, namely, the minimum value and the maximum value of signal delay of the echo path.

"n" represents an order for the cross-correlation coefficient calculation.

By calculating "k" where the cross-correlation coefficient r(k) calculated by the cross-correlation coefficient calculation portion 112 is largest, it is possible to detect the delay amount of the echo path.

Figure 4:
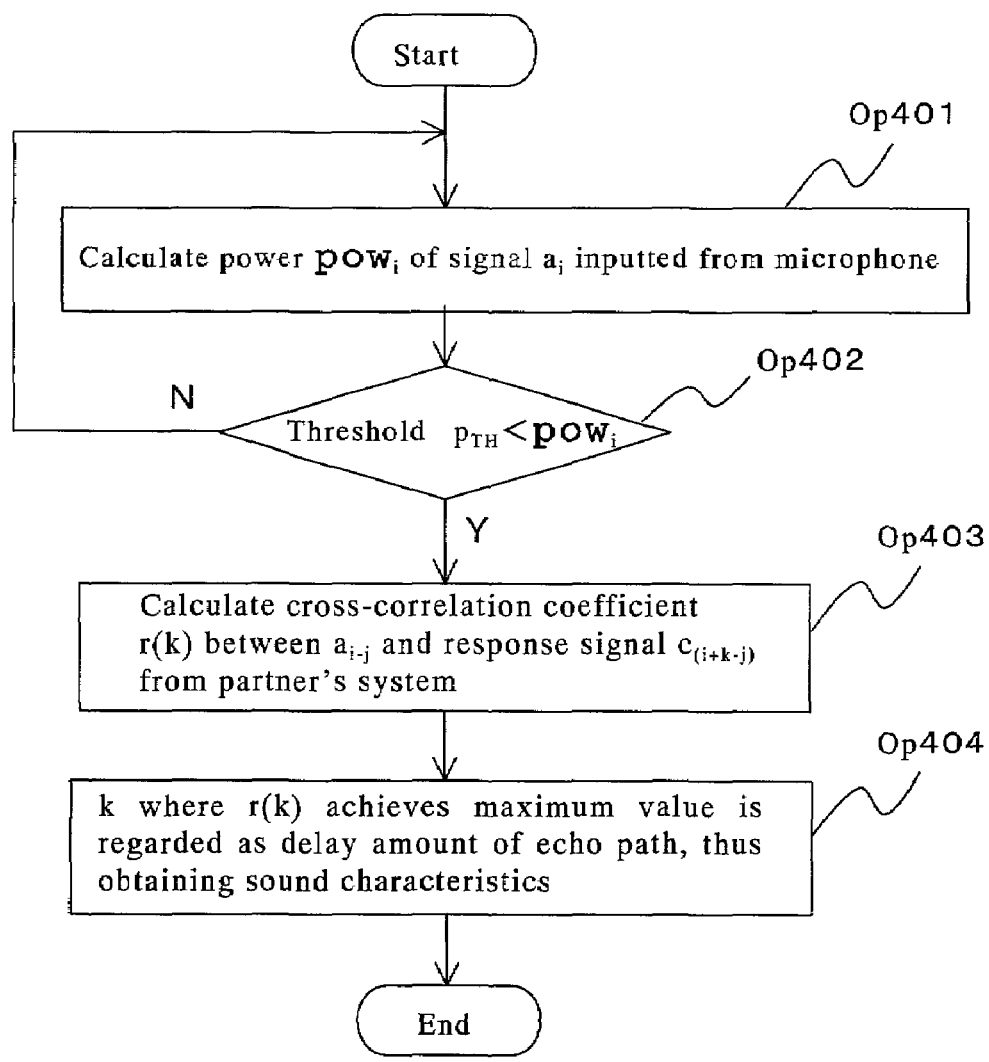
FIG. 4 is a flowchart showing an example of a process flow of detecting the section of the response signal containing the echo with respect to a voice by using a cross-correlation coefficient calculation in an echo canceling system of the second embodiment of the present invention.

FIG. 4 is a flowchart showing an example of a process flow of detecting the section of the response signal containing the echo with respect to the voice by using the cross-correlation coefficient calculation described above.

First, the voice signal $a_i$ inputted from the microphone 11 is received so as to calculate the power (operation Op401). Whether the power exceeds the threshold ($P_{TH}$) is checked. If it does not exceed the threshold (operation Op402: N), it is judged that the voice signal serving as the reference signal is not inputted, so that the wait processing is performed after returning to the operation Op401. If it exceeds the threshold (operation Op402: Y), it is judged that the voice signal $a_i$ serving as the reference signal is inputted, thus moving on to the next operation Op403.

In the operation Op403, the cross-correlation coefficient r(k) between the voice signal "$a_{i-j}$" serving as the reference signal and the signal sections $c_{si+k-j}$ of the response signal serving as the comparative signal is calculated.

In the operation Op404, "k" where the cross-correlation coefficient r(k) of the signal sections calculated in the operation Op403 achieves the maximum value is specified, and the time corresponding to the "k" is regarded as the delay amount of the echo path so as to be the sound characteristics information.

In the above configuration, it may be possible that the speaker inputs an instruction whereby the sound characteristics detecting portion starts processing of detecting the sound characteristics information of the echo path.

As described above, in the echo canceling system of the second embodiment, by searching the signal section where the cross-correlation coefficient with the voice signal as the reference signal is largest in the search range of the response signal, it is possible to detect the section containing the voice signal serving as the reference signal from the signal received from the microphone and the section of the response signal containing the echo with respect to the voice from the response signal that is obtained from the partner side and serves as the comparative signal in an accurate and flexible manner.

Third Embodiment

The third embodiment is directed to an echo canceling system in which a contrivance in the sound characteristics detecting processing is incorporated. In this system, in detecting sound characteristics information of the echo path by the sound characteristics detecting portion, a threshold and a search range can be adjusted with respect to a correlation value between a reference signal on the speaker system side and a response signal returned from the conversation partner side.

Figure 5:
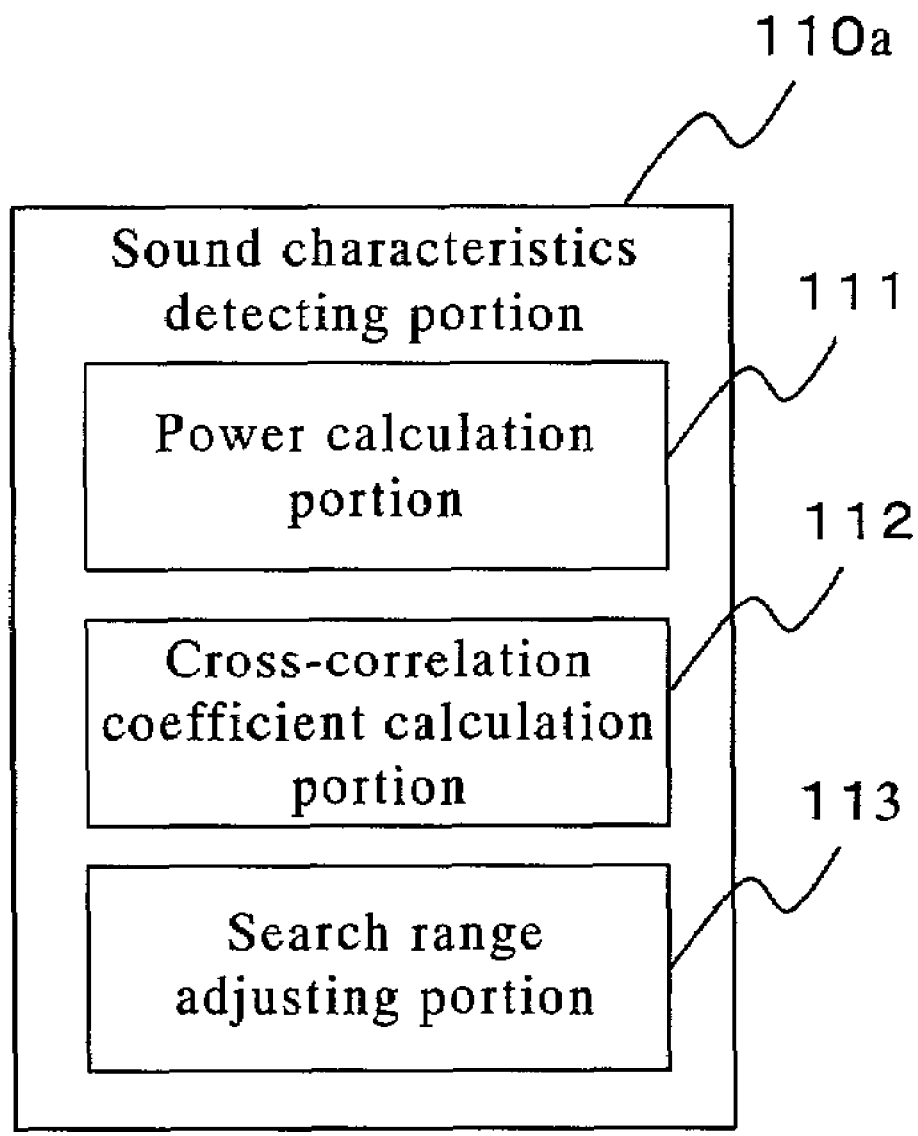
FIG. 5 shows a structural example of a sound characteristics detecting portion 110a that can adjust a search range of a cross-correlation coefficient in an echo canceling system of the third embodiment of the present invention.

FIG. 5 shows a structural example of a sound characteristics detecting portion 110a that can adjust the search range of the cross-correlation coefficient. In FIG. 5, the sound characteristics detecting portion 110a includes not only the power calculation portion 111 and the cross-correlation coefficient calculation portion 112, but also a search range adjusting portion 113.

The search range adjusting portion 113 adjusts the search range of the cross-correlation coefficient. Referring to the second embodiment, it adjusts the range of the order "k" of the cross-correlation coefficient, namely, changes $k_{MIN}$ and $k_{MAX}$ in Equation 5 for calculating the cross-correlation coefficient. As one example, the following adjusting method is described. First, a threshold $r_{TH}$ is set for the cross-correlation coefficient r(k). When no coefficient exceeding this threshold $r_{TH}$ is obtained as the cross-correlation coefficient with the voice signal as the reference signal in the search range of the response signal, it is regarded that the echo is outside the search range of the response signal, in such case as the delay is unexpectedly large because of the sound characteristics of the echo path. Thus, the search range is adjusted so as to have a wider range.

Figure 6:
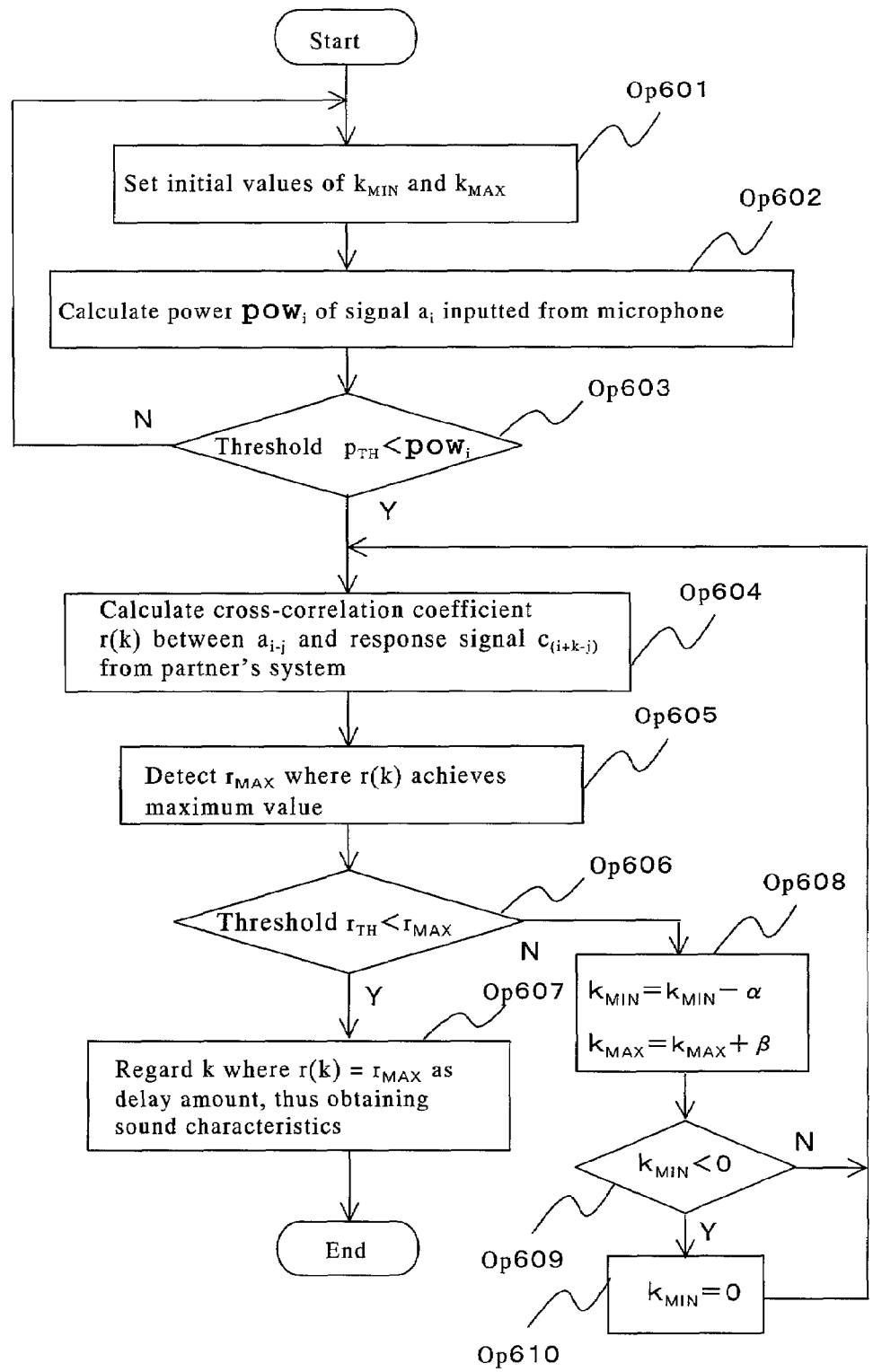
FIG. 6 is a flowchart showing an adjusting process flow in a search range adjusting portion 113 in the echo canceling system of the third embodiment of the present invention.

The following is an example of an adjusting processing in the search range adjusting portion 113. FIG. 6 is a flowchart showing an adjusting process flow in the search range adjusting portion 113.

First, initial values of $k_{MIN}$ and $k_{MAX}$ representing lower and upper limits of the search range are set (operation Op601).

Steps S602 to S604 are similar to the operations Op401 to Op403 in the flowchart of FIG. 4 in the second embodiment. In order to detect a significant voice signal section, the power of the signal is calculated by the power calculation portion 111 (operation Op602), so that the signal having the power exceeding the threshold is regarded as the reference signal $a_i$ (operation Op603). Then, the cross-correlation coefficient r(k) between the voice signal $a_{i-j}$ serving as the reference signal and the signal sections $c_{(i+k\ -j)}$ of the response signal serving as the comparative signal is calculated (operation Op604).

In the third embodiment, "$r_{MAX}$" where the cross-correlation coefficient r(k) of the signal sections calculated in the operation Op604 achieves the maximum value is detected (operation Op605). Whether $r_{MAX}$ exceeds the threshold $r_{TH}$ of the cross-correlation coefficient is checked (operation Op606). If it exceeds the threshold $r_{TH}$ (operation Op606: Y), it is judged that a part seemed to be an echo is present in the search range, so that the value of this "k" is regarded as the delay amount based on the sound characteristics of the echo path (operation Op607).

If $r_{MAX}$ does not exceed the threshold $r_{TH}$ (operation Op606: N), it is judged that the part seemed to be an echo is not present in the search range of the response signal section of the initial setting. In order to expand the search range, the values of $k_{MIN}$ and $k_{MAX}$ are adjusted by setting $k_{MIN}=k_{MIN}-\alpha$ and $k_{MAX}=k_{MAX}+\beta$, (operation Op608). Since it is impossible that the value of $k_{MIN}$ is below zero (i.e., an echo is generated earlier), if $k_{MIN}$ is negative (operation Op609: Y), $k_{MIN}$ is regarded as zero (operation Op610). In this manner, the search range is adjusted so as to return to the operation Op604, where the cross-correlation coefficient is calculated again (operation Op604).

Also, it may be possible that the threshold $r_{TH}$ of the cross-correlation coefficient r(k) and the search range are adjusted with the help of an operation by the speaker.

As described above, when the sound characteristics detecting portion detects the sound characteristics information of the echo path, the echo canceling system of the third embodiment can adjust the search range based on a calculation result of the cross-correlation coefficient between the reference signal in the system on the speaker side and the response signal returned from the conversation partner side.

Fourth Embodiment

The fourth embodiment is directed to an echo canceling system in which a contrivance in the sound characteristics detecting processing is incorporated. In this system, the sound characteristics information is detected using a signal for detecting the sound characteristics. A sound characteristics detecting portion includes a signal generating portion for generating a sound characteristics detecting signal, which serves as a reference signal. Before starting a conversation, the sound characteristics detecting portion detects the sound characteristics information of the echo path seen from the speaker side using the reference signal and the response signal returned from the conversation partner side.

Figure 7:
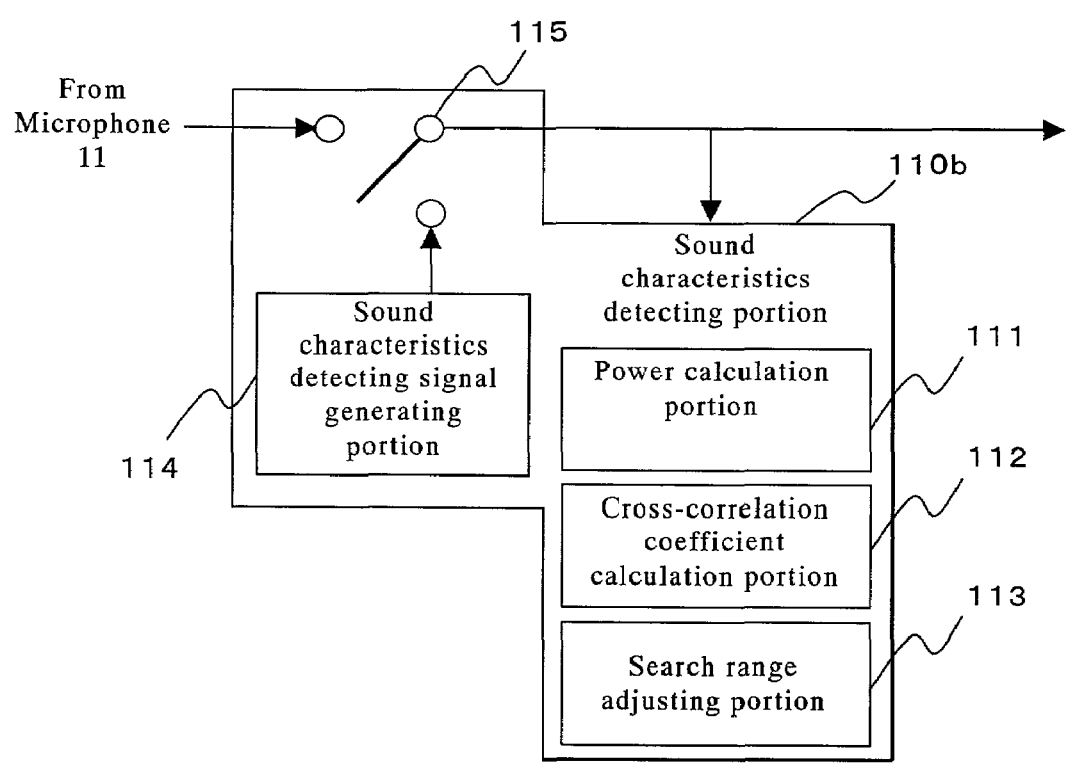
FIG. 7 is a diagram showing a structural example of a device when using a signal for detecting sound characteristics in the fourth embodiment of the present invention.

FIG. 7 shows a structural example of a device when using the signal for detecting the sound characteristics. In the structural example of FIG. 7, a sound characteristics detecting portion 110b includes a sound characteristics detecting signal generating portion 114 and a switch 115.

It is preferable that the sound characteristics detecting signal generating portion 114 generates a signal with a small amount of the auto-correlation such as pulse or white noise as the reference signal. Also, in order to generate a user-friendly tone, music that does not annoy the user may be used. It is also preferable that the tone having a frequency higher or lower than an audio frequency band is used so as not to be heard by a user.

The switch 115 switches whether or not the sound characteristics detecting signal generating portion 114 is used in the sound characteristics detecting portion 110b. For example, in a phase of detecting the sound characteristics information at the beginning of the conversation, the side of the sound characteristics detecting signal generating portion 114 is turned on so as to adjust the value of the sound characteristics filter according to the sound characteristics, while in a phase of an echo canceling processing, the side of the microphone 11 is turned on.

With the above configuration, it is possible to use a signal suitable for detecting the sound characteristics information, thereby detecting the sound characteristics information of the echo path in an accurate manner.

However, when using the sound characteristics detecting signal, it is necessary to perform processings such as the transmission of the sound characteristics detecting signal and receipt of the echo sound, and the determination of the coefficient of the sound characteristics filter before starting the actual conversation. Accordingly, it also may be possible that, instead of a particular sound characteristics detecting signal, a voice signal inputted in the conversation is used as the reference signal, so that the sound characteristics detecting portion detects the sound characteristics of the echo path seen from the speaker side using this reference signal and the response signal returned from the conversation partner side. This makes it possible to detect the sound characteristics information constantly or at a fixed time interval during the conversation, thereby updating the sound characteristics of the echo path. Consequently, the optimal echo canceling processing always can be executed even when the sound characteristics vary.

Fifth Embodiment

The fifth embodiment is directed to an echo canceling system in which a contrivance in the echo canceling signal generating processing is incorporated. In this system, the echo canceling signal used in the echo canceling processing of the echo canceling processing portion is divided into a delayed part and a signal part following the delayed part, so that the former is processed by a delay filter and the latter is adjusted by a FIR filter or the like. As described above, the echo canceling signal is divided into the delayed part and the signal part following the delayed part so as to be processed arithmetically, thereby reducing a processing amount.

Figure 8:
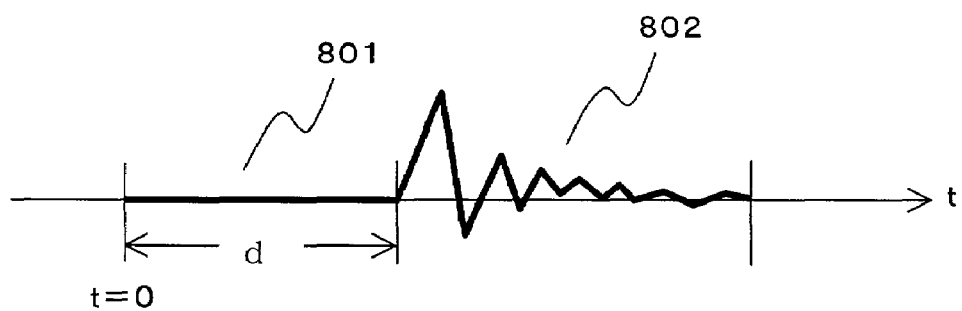
FIG. 8 shows an echo canceling signal in a simplified manner.

FIG. 8 shows the echo canceling signal in a simplified manner. t=0 indicates a timing when a sound characteristics detecting signal, for example, a pulse is inputted in a microphone in a speaker's system. As shown in FIG. 8, the echo canceling signal can be divided into a delayed part 801 and a signal part 802 following the delayed part 801. In this example, a delay sample number is "d". In the example of the first embodiment, an echo canceling signal having a form shown in FIG. 8 is generated by the learning identification method by using the sound characteristics filter 201 and the coefficient updating unit 202 shown in FIG. 2. On the other hand, in the fifth embodiment, the delay processing corresponding to the delayed part 801 is executed by the delay filter and the signal part corresponding to the signal part 802 is generated by the sound characteristics filter 201 such as the FIR filter. The signal is divided into the delayed part 801 and the signal part 802 following the delayed part 801 so as to be processed arithmetically, thereby achieving the processing amount smaller than that needed when processing a signal as an integral signal as in the first embodiment.

Figure 9:
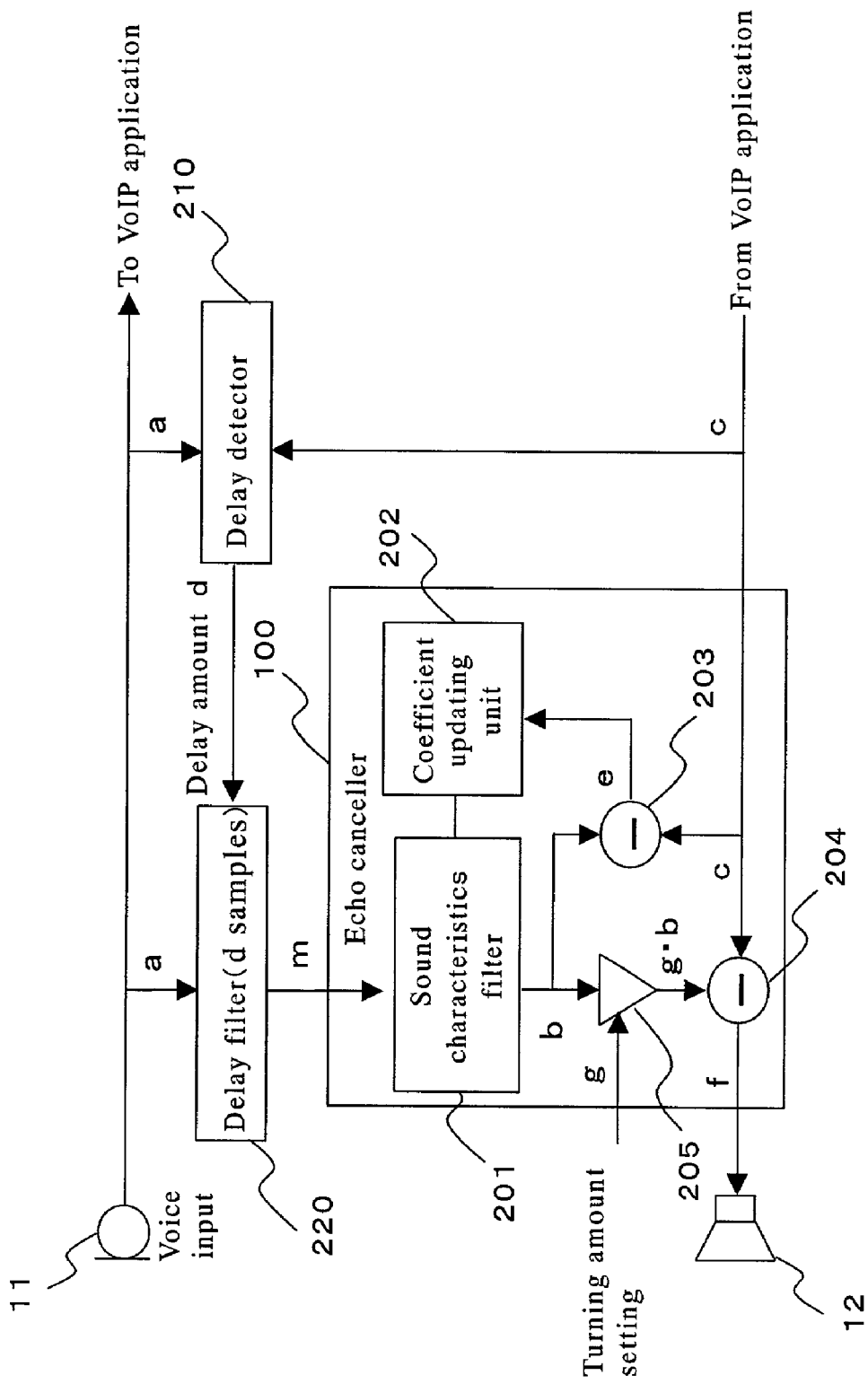
FIG. 9 is a diagram of a structural example of an echo canceling system of the fifth embodiment of the present invention, mainly showing an echo canceller part.

FIG. 9 is a diagram of a structural example of the echo canceling system of the fifth embodiment, mainly showing an echo canceller part. In FIG. 9, numeral 210 denotes a delay detector, and numeral 220 denotes a delay filter. The other elements are similar to those in FIG. 2 in the first embodiment, so the description thereof is omitted in this embodiment.

The delay detector 210 calculates the delay amount in the echo path. For example, a pulse signal is inputted from a microphone 11 at t=0 in a silent state, and the presence of a significant voice signal is detected in a response signal by the power calculation portion described in the second embodiment or the like. Then, the delay detector 210 may calculate the delay amount of this response signal. It is assumed that the delay amount "d" is detected in this embodiment.

The delay filter 220 provides a delay corresponding to the delayed part in the echo canceling signal. Based on the delay amount "d" that is calculated by the delay detector 210, the delay filter 220 is set so that the transfer function thereof in the Z region is $Z^{-d}$.

After the voice signal is subjected to the delay processing by the delay filter 220, processings are similar to those in the first embodiment. In adjusting the coefficient of the FIR filter, a signal "m" that has been subjected to the delay processing is processed arithmetically by the sound characteristics filter 201, then subjected to a subtracting processing with respect to the response signal by a subtracter 203. The coefficient of the FIR filter is adjusted via the coefficient updating unit 202 such that the difference is zero. In the echo canceling processing, by using the sound characteristics filter 201 whose coefficient has been adjusted, the signal that has been subjected to the delay processing is processed arithmetically, then subjected to a gain adjustment by a gain controller 205, so that the signal that has been subjected to the echo canceling processing is outputted to the loudspeaker 12. The echo canceling processing and the adjusting processing of the FIR filter coefficient described above achieve the processing amount smaller than that needed when arithmetically processing the voice signal as an integral signal as described in the first embodiment.

The elements described in the above embodiment also can be supplied as a hardware module. It also is possible that a processing program that achieves the processings of the above elements is described so that a general purpose microprocessor or the like can achieve such processings.

Sixth Embodiment

Although a plurality of microphones are used in the following description, either a microphone array or a plurality of microphones may be used.

In the echo canceling system according to the sixth embodiment, a system on a speaker side includes a loudspeaker and a plurality of microphones and performs a synchronous addition of input voice signals of the plurality of the microphones with respect to the direction of the speaker so as to enhance a voice signal intentionally, thereby improving an accuracy of the echo canceling system. A microphone sensitivity to a voice of the speaker is made higher than that to an output of the loudspeaker in the system on the speaker side, so as to weaken an acoustic coupling between the loudspeaker and the microphones, thereby reducing an influence of, what we call, a near-end undesirable path of the voice.

Figure 10:
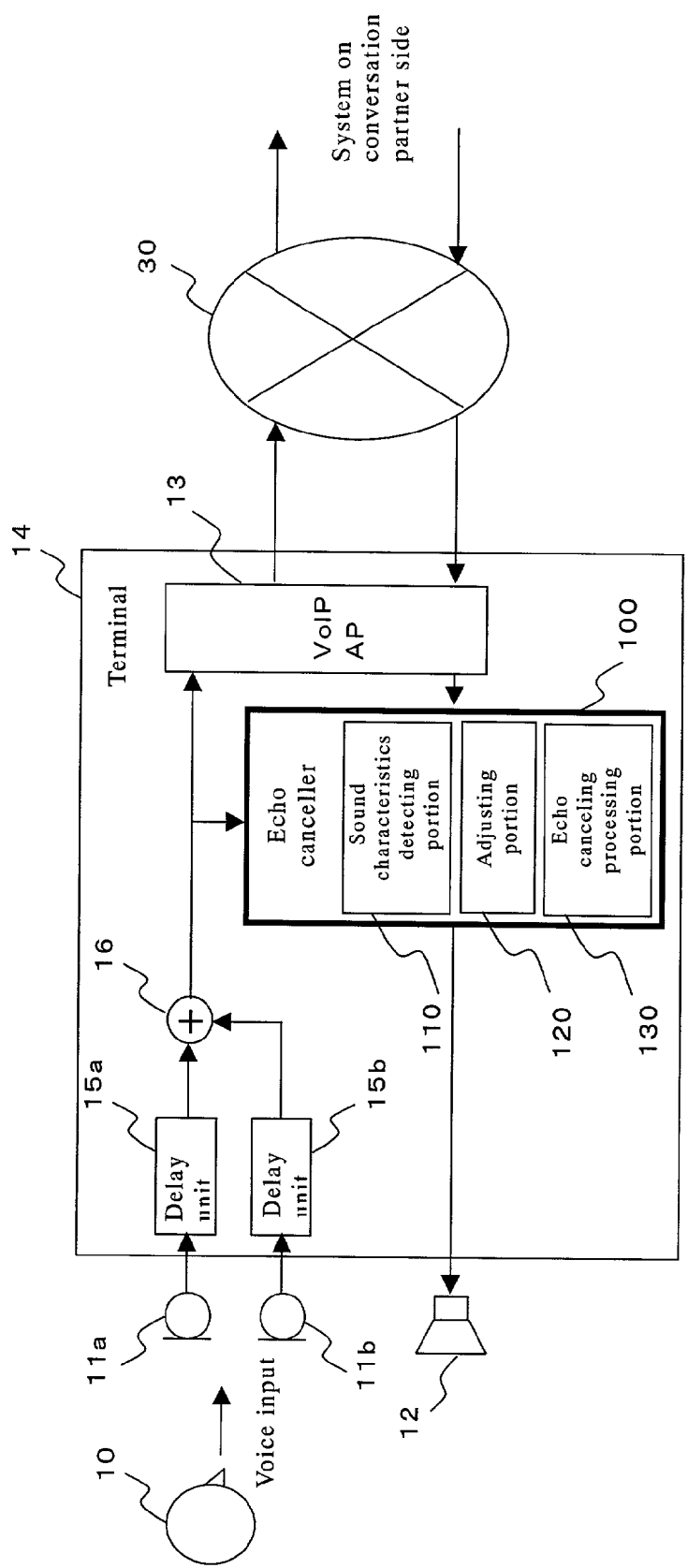
FIG. 10 is a diagram schematically showing an echo canceling system of the sixth embodiment of the present invention.

FIG. 10 shows a schematic configuration of the echo canceling system of the sixth embodiment. The configuration indicated by numerals 20 to 24 constituting the system on a conversation partner side, which was shown in FIG. 1, is omitted in this figure.

Although two microphones 11a and 11b are provided in the configuration of FIG. 10, three or more microphones may be provided. The microphones 11a and 11b are provided with delay units 15a and 15b respectively. Numeral 16 denotes an adder.

The delay amounts of the delay units 15a and 15b are set such that directionality of the respective microphones 11a and 11b matches an assumed direction of a speaker 10. Outputs of the delay units 15a and 15b are both inputted to the adder 16. A synchronous addition in the adder 16 enhances a voice signal from the speaker and cancels out voice signals from the other directions (noise). In this example, it cancels out an echo signal outputted from the loudspeaker 12 that is returned because of a far-end undesirable path. The output signal that is subjected to the synchronous addition as described above is transmitted to an echo canceller 100 and a VoIP application 13. The echo canceller 100 and the VoIP application 13 may be the ones described in the first to fifth embodiments.

Seventh Embodiment

Although a plurality of microphones are used in the following description, either a microphone array or a plurality of microphones may be used.

In the echo canceling system according to the seventh embodiment, a system on a speaker side includes a loudspeaker and a plurality of microphones and performs a synchronous subtraction of input voice signals of the plurality of the microphones with respect to the direction of the loudspeaker so as to cancel out a near-end echo signal outputted from the loudspeaker, thereby improving an accuracy of the echo canceling system. A microphone sensitivity to an output of the loudspeaker in the system on the speaker side is made lower, so as to weaken an acoustic coupling between the loudspeaker and the microphones, thereby reducing an influence of, what we call, a near-end undesirable path of the voice.

Figure 11:
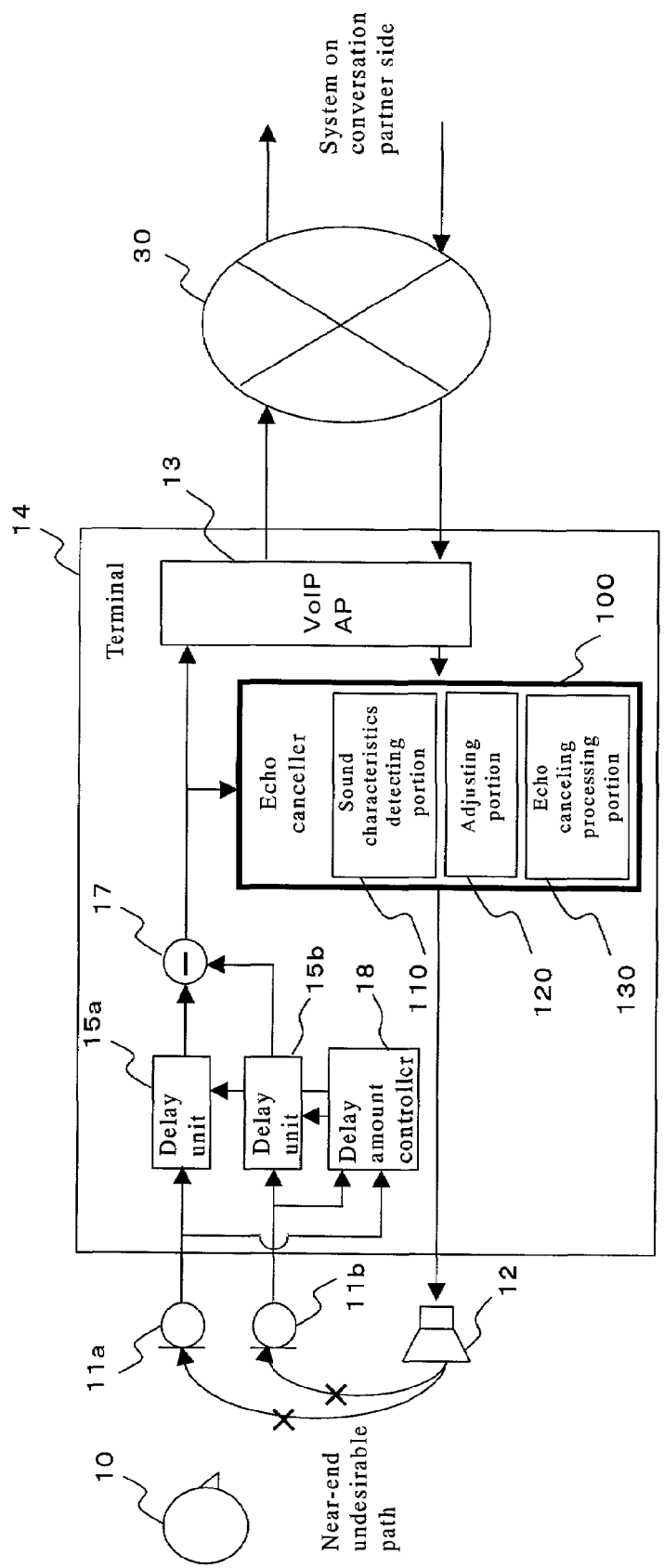
FIG. 11 is a diagram schematically showing an echo canceling system of the seventh embodiment of the present invention.

FIG. 11 shows a schematic configuration of the echo canceling system of the seventh embodiment. The configuration indicated by numerals 20 to 24 constituting the system on a conversation partner side, which was shown in FIG. 1, is omitted in this figure.

Although two microphones 11a and 11b are provided in the configuration of FIG. 11, three or more microphones may be provided. The microphones 11a and 11b are provided with delay units 15a and 15b respectively. Numeral 17 denotes a subtracter, and numeral 18 denotes a delay amount controller.

The delay amounts of the delay units 15a and 15b are set to match the delay amounts of voice signals that reach the respective microphones 11a and 11b from the direction of the loudspeaker 12. The delay amount controller 18 adjusts those delay amounts. Outputs of the delay units 15a and 15b are both inputted to the subtracter 17. A synchronous subtraction in the subtracter 17 cancels out the voice signals from the direction of the loudspeaker 12. In other words, it eliminates an echo signal that is returned because of a far-end undesirable path and outputted from the loudspeaker 12. The output signal that is subjected to the synchronous subtraction as described above is transmitted to an echo canceller 100 and a VoIP application 13. The echo canceller 100 and the VoIP application 13 may be the ones described in the first to fifth embodiments.

Eighth Embodiment

Figure 12:
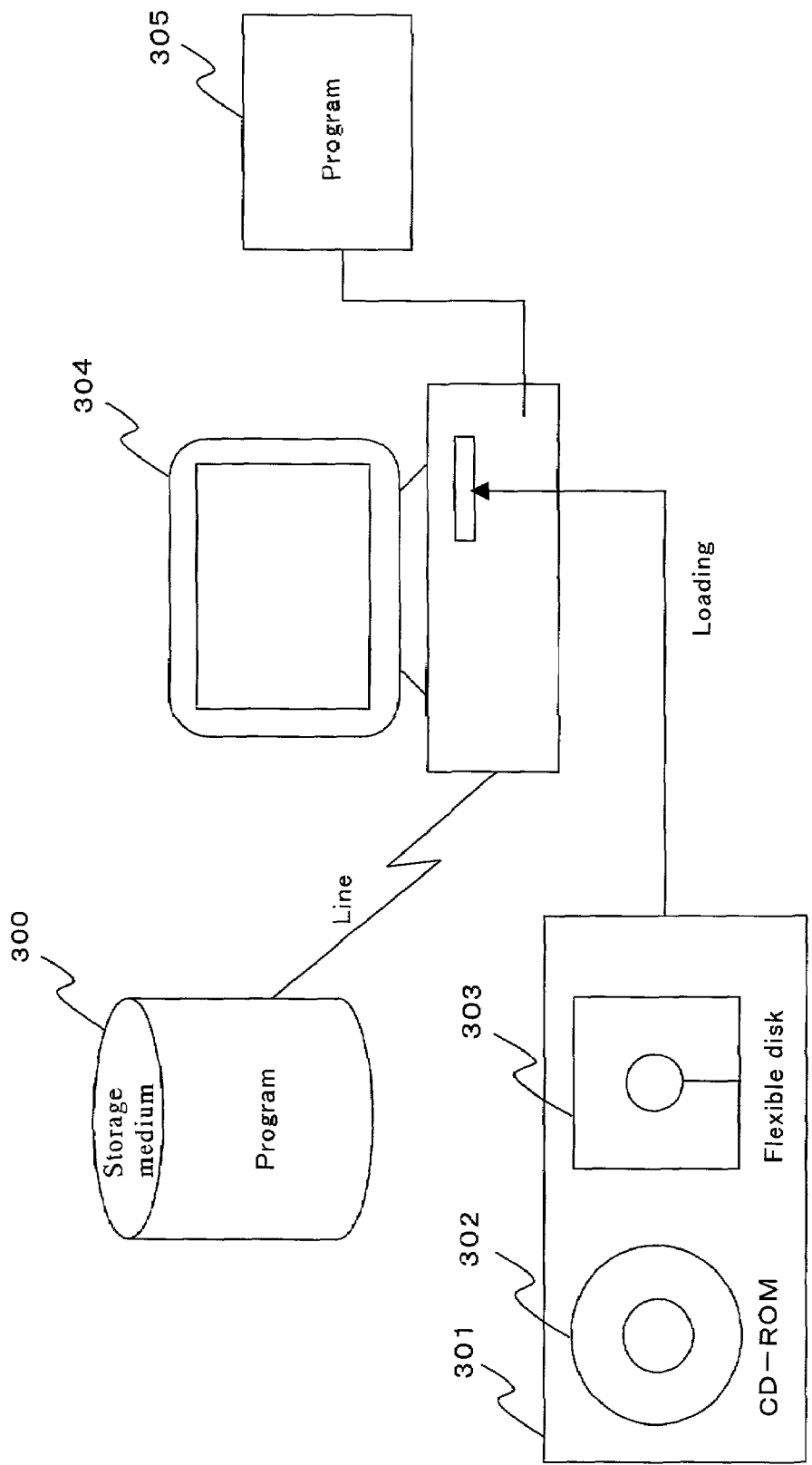
FIG. 12 shows an example of a recording medium on which a program of processing operations for achieving the echo canceling system of the present invention is recorded.
Figure 13:
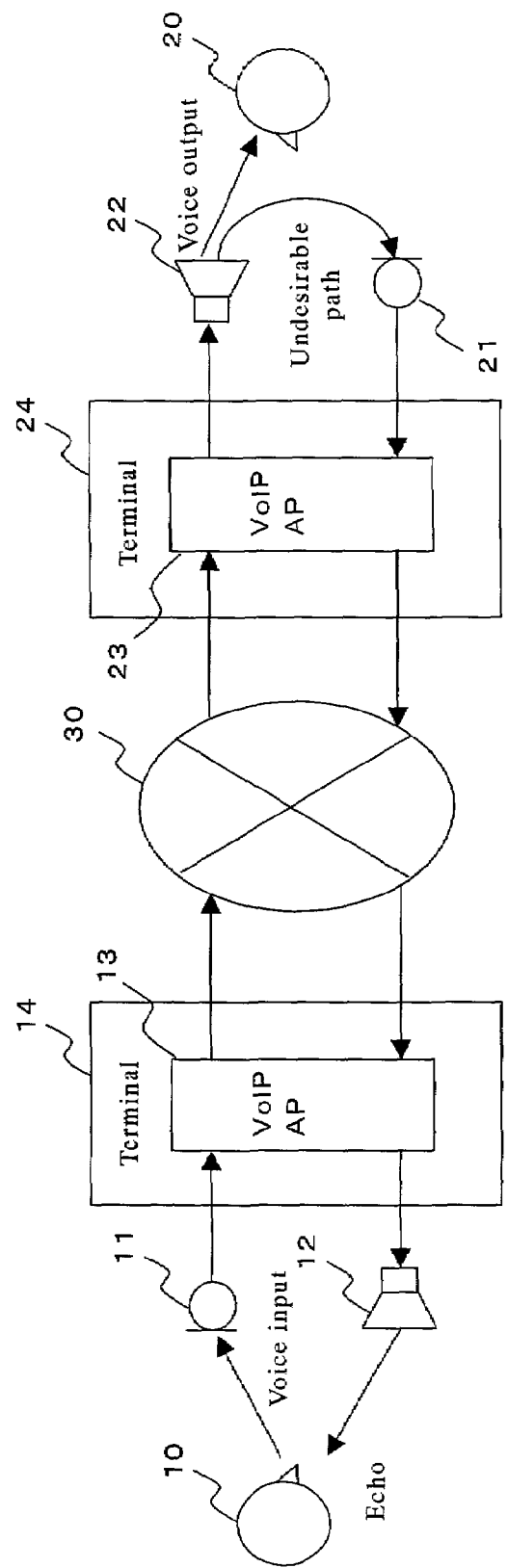
FIG. 13 is a diagram schematically showing a conventional full-duplex communication system.
Figure 14:
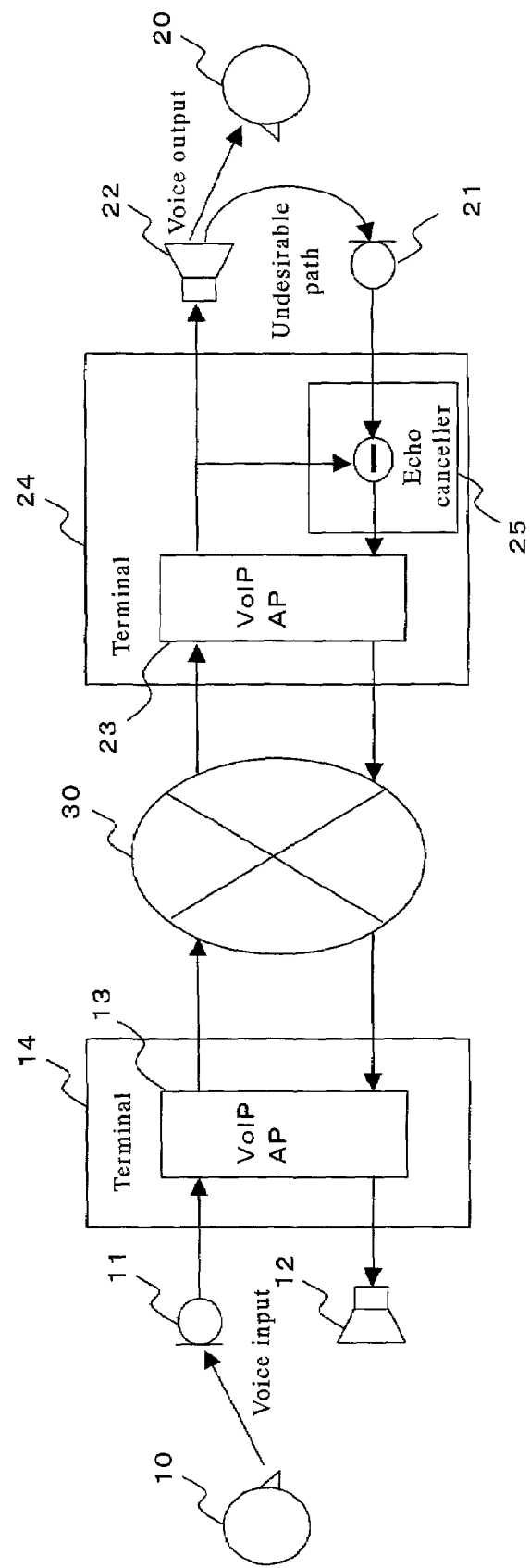
FIG. 14 is a diagram schematically showing an echo canceling system using a conventional echo canceller.

The echo canceling system according to the present invention can be configured using various computers by providing a program including the processing operations for realizing the configurations as described above. When loading the program provided with the processing operations realizing the echo canceling system according to the present invention into the computer, the recording medium on which such program is recorded may be read by the computer or can be downloaded from a network. For example, as shown in FIG. 12, a portable recording medium 301 such as a CD-ROM 302 or a flexible disk 303 can be read by a computer 304 or downloaded from a recording medium 300 in a recording apparatus on the network. Also, it may be stored in a recording medium 305 such as a hard disk or a RAM in the computer 304 from the beginning. When executing the program, this program is loaded into the computer 304 and executed in its main memory.

In the first to eighth embodiments, it is possible that the sound characteristic detecting portion starts processing of detecting the sound characteristics information of the echo path by the instruction from the speaker. It is also possible that a threshold and a correlation search range with respect to a correlation value between the reference signal on the speaker system side and the response signal returned from the conversation partner side can be adjusted by an operation of the speaker.

With the above configuration, the speaker can have the initiative in acknowledging the start of the echo canceling processing and in adjusting the echo canceling processing.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An echo canceling system for a full-duplex communication system comprising:
   a sound characteristics detecting portion detecting sound characteristics information of an echo path seen from a speaker side;
   an echo canceling processing portion canceling an echo included in a signal returned from a system on a conversation partner side based on the sound characteristics information detected by the sound characteristics detecting portion;
   the sound characteristics detecting portion and the echo canceling portion being installed in a communication system not on the conversation partner side but on the speaker side; and
   an adjusting portion receiving a tuning signal of an echo canceling processing from a speaker, wherein the echo canceling processing portion cancels the echo using the tuning signal in additional to the sound characteristics information detected by the sound characteristics detecting portion.

2. The echo canceling system according to claim 1, wherein the sound characteristics detecting portion comprises a signal generating portion for generating a sound characteristics detecting signal, which serves as a reference signal, and
   before starting a conversation, the sound characteristics detecting portion detects the sound characteristics information of the echo path seen from the speaker side using the sound characteristics detecting signal and a response signal returned from the conversation partner side.

3. The echo canceling system according to claim 3, wherein, in detecting the sound characteristics information of the echo path by the sound characteristics detecting portion, a threshold and a correlation search range with respect to a correlation value between the reference signal in the system on the speaker side and the response signal returned from the conversation partner side can be adjusted.

4. The echo canceling system according to claim 1, wherein a voice signal inputted during a conversation is regarded as a reference signal, and
   the sound characteristics detecting portion detects the sound characteristics information of the echo path seen from the speaker side using the voice signal and a response signal returned from the conversation partner side.

5. The echo canceling system according to claim 4, wherein, in detecting the sound characteristics information of the echo path by the sound characteristics detecting portion, a threshold and a correlation search range with respect to a correlation value between the reference signal in the system on the speaker side and the response signal returned from the conversation partner side are adjusted.

6. The echo canceling system according to claim 1, wherein an echo canceling signal used in the echo canceling processing of the echo canceling processing portion is divided into a delayed part and a signal part following the delayed part, and
   the echo canceling processing portion includes a delay filter for providing a delay corresponding to the delayed part and a signal filter for generating a signal corresponding to the signal part.

7. The echo canceling system according to claim 1, wherein the system on the speaker side comprises a loudspeaker and a plurality of microphones and performs a synchronous addition of input voice signals of the plurality of the microphones with respect to a direction of the speaker so as to enhance a voice signal.

8. The echo canceling system according to claim 1, wherein the system on the speaker side comprises a loudspeaker and a microphone array or a plurality of microphones and performs a synchronous subtraction of input voice signals of the microphone array or the plurality of the microphones with respect to a direction of the loudspeaker so as to cancel out an echo signal outputted from the loudspeaker.

9. The echo canceling system according to claim 1, wherein the speaker can choose execution or suspension of the echo canceling processing by the echo canceling processing portion and of the sound characteristics detecting processing of the echo path by the sound characteristics detecting portion.

10. An echo canceling processing program performing echo canceling processing for a full-duplex communication system, the program comprising program codes of:

a sound characteristics detecting processing operation detecting sound characteristics information of an echo path seen from a speaker side;

an echo canceling processing operation canceling an echo included in a signal returned from a system on a conversation partner side based on the sound characteristics information detected in the sound characteristics detecting processing operation;

the sound characteristics detecting portion and the echo canceling portion being installed in a communication system not on the conversation partner side but on the speaker side; and an adjusting operation receiving a tuning signal of an echo canceling processing from a speaker, wherein the echo canceling processing portion cancels the echo using the tuning signal in addition to the sound characteristics information detected by the sound characteristics detecting portion.

11. An echo canceling processing program readable by a computer for controlling the computer to perform echo canceling processing for a full-duplex communication system, by:

detecting sound characteristics information of an echo path seen from a speaker side;

canceling an echo included in a signal returned from a system on a conversation partner side based on the sound characteristics information detected in the sound characteristics detecting processing operation;

the sound characteristics detecting and the echo canceling being performed in a communication system not on the conversation partner side but on the speaker side; and receiving a tuning signal of an echo canceling processing from a speaker, and controlling the echo canceling processing to cancel the echo using the tuning signal in addition to the sound characteristics information detected by the sound characteristics detecting.

* * * * *

UNITED STATES PATENT AND TRADEMARK OFFICE
CERTIFICATE OF CORRECTION

PATENT NO. : 7,072,310 B2  Page 1 of 1
APPLICATION NO. : 09/867664
DATED : July 4, 2006
INVENTOR(S) : Naoshi Matsuo It is certified that error appears in the above-identified patent and that said Letters Patent is hereby corrected as shown below:

Column 16, Line 12, change "claim 3," to --claim 2,--.

Title Page Column 1 (U.S. Patent Documents), Line 5, below "5,410, 595 A  4/1995 Park et al." insert:
--4,914,692 A  4/1990 Hartwell et al.--
--5,495,473 A  2/1996 Cox--
--5,691,978 A  11/1997 Kenworthy--
--6,185,195 A  2/2001 Leung--
--6,678,254 A  1/2004 Song--
--6,725,066 A  4/2004 Maurer--
--6,768,776 A  7/2004 Lu--

Signed and Sealed this

Tenth Day of April, 2007

JON W. DUDAS
*Director of the United States Patent and Trademark Office*